United States Patent
Campagna

(10) Patent No.: US 8,380,587 B2
(45) Date of Patent: Feb. 19, 2013

(54) SYSTEM AND METHOD FOR VENDOR MANAGED SUBSIDIZED SUPPLY PIPELINE FOR BUSINESS CONTINUITY

(75) Inventor: Matthew J. Campagna, Ridgefield, CT (US)

(73) Assignee: Pitney Bowes Inc., Stamford, CT (US)

( * ) Notice: Subject to any disclaimer, the term of this patent is extended or adjusted under 35 U.S.C. 154(b) by 3609 days.

(21) Appl. No.: 10/726,252

(22) Filed: Dec. 1, 2003

(65) Prior Publication Data

US 2005/0119949 A1   Jun. 2, 2005

(51) Int. Cl.
*G06Q 10/00* (2012.01)
(52) U.S. Cl. .................................. 705/28; 705/7.12
(58) Field of Classification Search .................. None
See application file for complete search history.

(56) References Cited

U.S. PATENT DOCUMENTS

| | | | |
|---|---|---|---|
| 6,996,538 B2* | 2/2006 | Lucas | 705/28 |
| 8,019,662 B2* | 9/2011 | Lucas | 705/28 |
| 2003/0018513 A1* | 1/2003 | Hoffman et al. | 705/10 |
| 2005/0114233 A1* | 5/2005 | Mays | 705/28 |

* cited by examiner

*Primary Examiner* — Asfand Sheikh
(74) *Attorney, Agent, or Firm* — George M. Macdonald; Charles R. Malandra, Jr.; Steven J. Shapiro

(57) ABSTRACT

A system and method are described for establishing and managing a vendor inventory of emergency business supplies for a business. The vendor is compensated for costs of maintaining the inventory. The business supplies are released periodically, for discount sale, after they have been in the vendor inventory for a period of time expiring when a release condition occurs. The vendor inventory is then restocked, and the vendor is compensated at least partially for the discount provided in the discount sale.

19 Claims, 3 Drawing Sheets

SYSTEM AND METHOD FOR VENDOR MANAGED SUBSIDIZED SUPPLY PIPELINE FOR BUSINESS CONTINUITY

TECHNICAL FIELD

The present invention relates to inventory management, and in particular to inventory management for emergency supply situations.

BACKGROUND

Disaster and recovery planning involves the immediate re-supply of core business items, PCs, networking equipment, desks, and the like. In the past, these items have not been immediately available due to ebbs and flows in the vendor's inventory. In the past, this has been resolved with supply contracts that are not directly backed with actual inventory. Thus, even though the business needing the supplies may be adequately insured financially, still the actual supplies are not immediately available, or are available at an unacceptable cost because supply does not meet demand.

SUMMARY OF THE INVENTION

The illustrative embodiments of the present application describe mechanisms for customers to subsidize a vendor's supply pipeline for the purpose of filling that pipeline with equipment to meet a customer's disaster and recovery requirements. Under normal conditions, items exiting the pipeline are sold to third parties, possibly at discounted prices. The customer incurs a cost for the discounted sales to third parties. In the event of a disaster, the pipeline buffer equipment is guaranteed to be immediately available to the customer.

Entities with disaster and recovery equipment needs subsidize a warehousing pipeline buffer of equipment managed by the equipment vendor (e.g. a manufacturer, seller, supplier, or the like). This pipeline guarantees the equipment for the customer without burdening the customer with the storage, handling and restocking of the pipeline. It also compensates the vendor for the maintenance of this storage pipeline via fees and subsidized discounts for aged equipment leaving the pipeline.

The illustrative embodiments of the present application have at least several advantages. For example, the subsidized pipeline is used to guarantee the existence of necessary business continuity equipment for the customer, while possibly generating new revenue sources for a vendor. Ownership by an entity different from the vendor can be attached to equipment in the pipeline. The equipment in the pipeline is immediately available to the customer in times of emergency.

DETAILED DESCRIPTION OF EMBODIMENTS

Vendors and/or suppliers currently maintain a warehouse of equipment that is stocked according to market supply and demand influences. The present business mechanism subsidizes the cost of filling a pipeline with equipment for a particular customer. This pipeline may contain equipment that has a shelf life and so may be pushed through and out of the pipeline and then either sold by the vendor or consumed by the customer itself. The equipment in the pipeline can be assigned temporary ownership to the customer, thus ensuring the availability of the equipment in emergency situations. Once the equipment ages out of the pipeline, the equipment may be consumed by the customer directly, sold by the customer (possibly via the vendor), or the ownership of the equipment could be transferred back to the vendor for sale. Alternatively, the client directly consumes the items in the pipeline at any time, triggering the pipeline to be re-stocked by the vendor/supplier. All orders from a particular customer may be made against the pipeline.

It is envisioned that this service would be at some cost to the customer, either in the form of a monthly service fee based on the size of the pipeline and the equipment in the pipeline. This pipeline of disaster and recovery equipment may also prove to be a valuable commodity in times of crisis and could be sold by the customer to a third party requiring an immediate supply.

Figure 1:
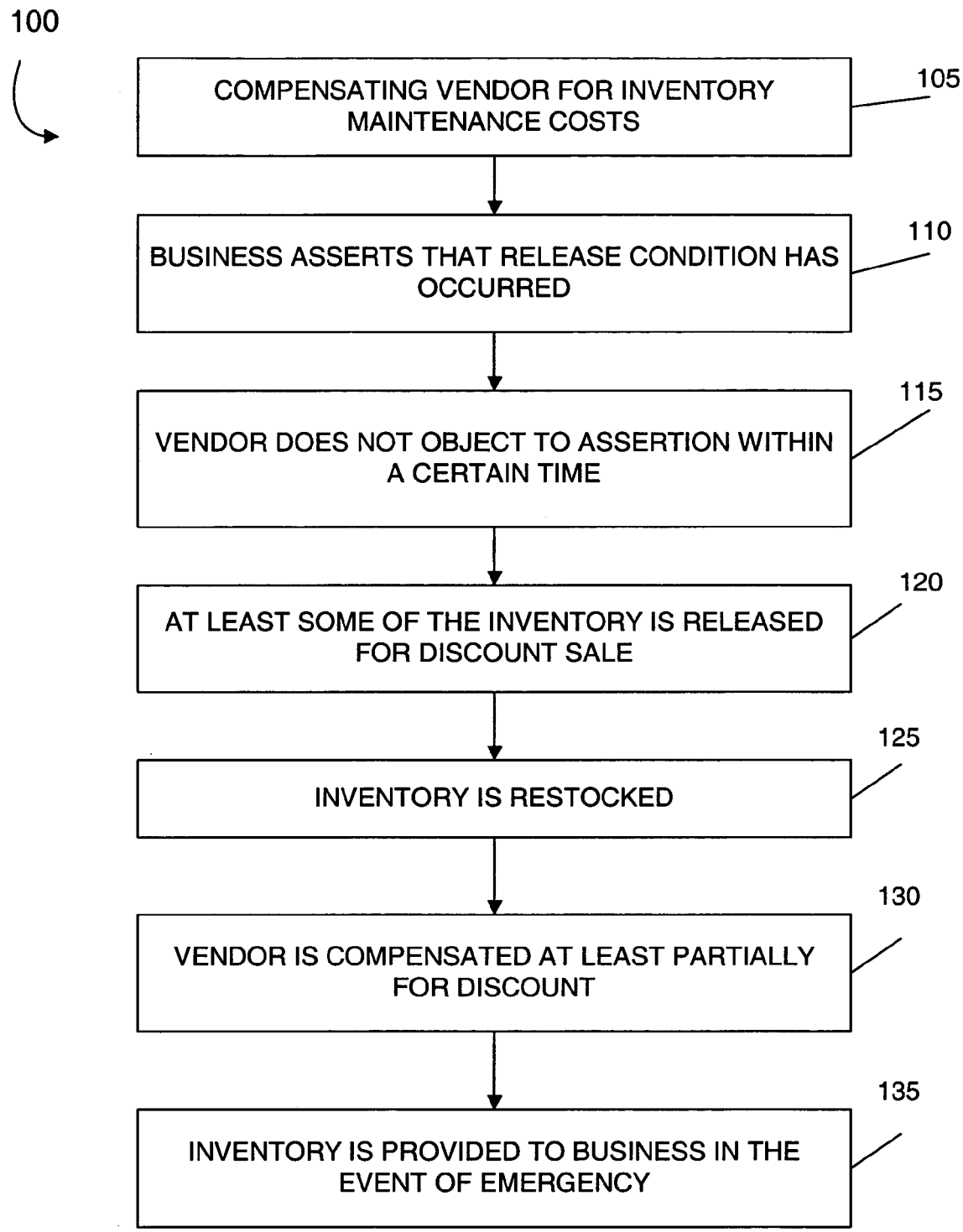
FIG. 1 is a flow chart showing an embodiment of the present invention.

The present invention can be more fully appreciated by reference to the accompanying drawings. As seen in FIG. 1, a method 100 ensures that a business will have supplies available in case of an emergency. The emergency may be a natural disaster, a terrorist attack, or even a sudden and unusual demand for the services of the business. According to this embodiment, the business would perform the method jointly with a vendor, and of course the same method can be simultaneously performed jointly by the same business and another vendor. For example, one vendor might be a manufacturer of personal computers, while another vendor might be a supplier of bottled water or an even more perishable item such as cheese. The vendor will maintain an inventory of the business supplies, and will be compensated 105 for doing so.

The vendor and the business arrange for the supplies to be sold off at a discount, in order to restock the inventory, whenever a release condition occurs. This may involve a process of consultation between the vendor and the business, plus monitoring of alternative stock that becomes available on the market, plus inspection of the inventory to see what condition it is in. In any case, since the business is a paying customer of the vendor, the business should be able to have a high degree of control over when the supplies are to be sold at a discount, but at the same time the vendor should be able to dispute that the pre-established release condition has actually occurred. One convenient way to balance these interests is to only allow the supplies to be sold at a discount if the business asserts 110 that a release condition has occurred, and then the vendor will have a fixed time (e.g. a week) to object 115 to that assertion, and otherwise the vendor will be deemed to have agreed to the assertion. If the vendor sells off supplies at a discount without such an assertion by the business, and immediately restocks the inventory, then the business would be under no obligation to compensate the vendor for any part of the discount involved in the discount sale 120.

The release condition can be that improved business supplies become available for insertion into the vendor inventory. For example, as new and more efficient desktop computer are developed, it is to the advantage of the business that its emergency inventory not contain antiquated desktop computers. So, every now and then, the desktop computers in the inventory will be sold at a discount, and the inventory will be restocked 125 with a better product. The business would compensate 130 the vendor for at least part of the discount. This can be, for example, a certain percentage of the discount that is less than 100% so that the vendor will have a good incentive to sell at the least possible discount.

Of course, the bottom line is that, if an emergency occurs, the inventory will be provided 135 to the business. This contrasts with present circumstances in which many businesses may be prepared financially for an emergency due to insurance coverage, but at the same time would face a huge spike in prices if vendors are not prepared to immediately fill all emergency orders.

Other types of release conditions are possible, such as that the business supplies have reached a particular age, or a particular percentage of shelf life, or a particular state of decay. The business itself may take part in the discount sale, which provides the business with more flexibility and options, while benefiting the vendor also because a greater demand for the items will tend to decrease the discount.

The business supplies in the vendor inventory may be owned by the vendor, or owned by the business instead of the vendor (at least temporarily). In the latter case, the business will not have to compete with third parties when it wants to obtain business supplies that are released from the inventory. In either case, the business can obtain the supplies, either for the use of the business itself, or in order for the business to sell at least some of the business supplies to a third party, thereby potentially making a profit.

Figure 2:
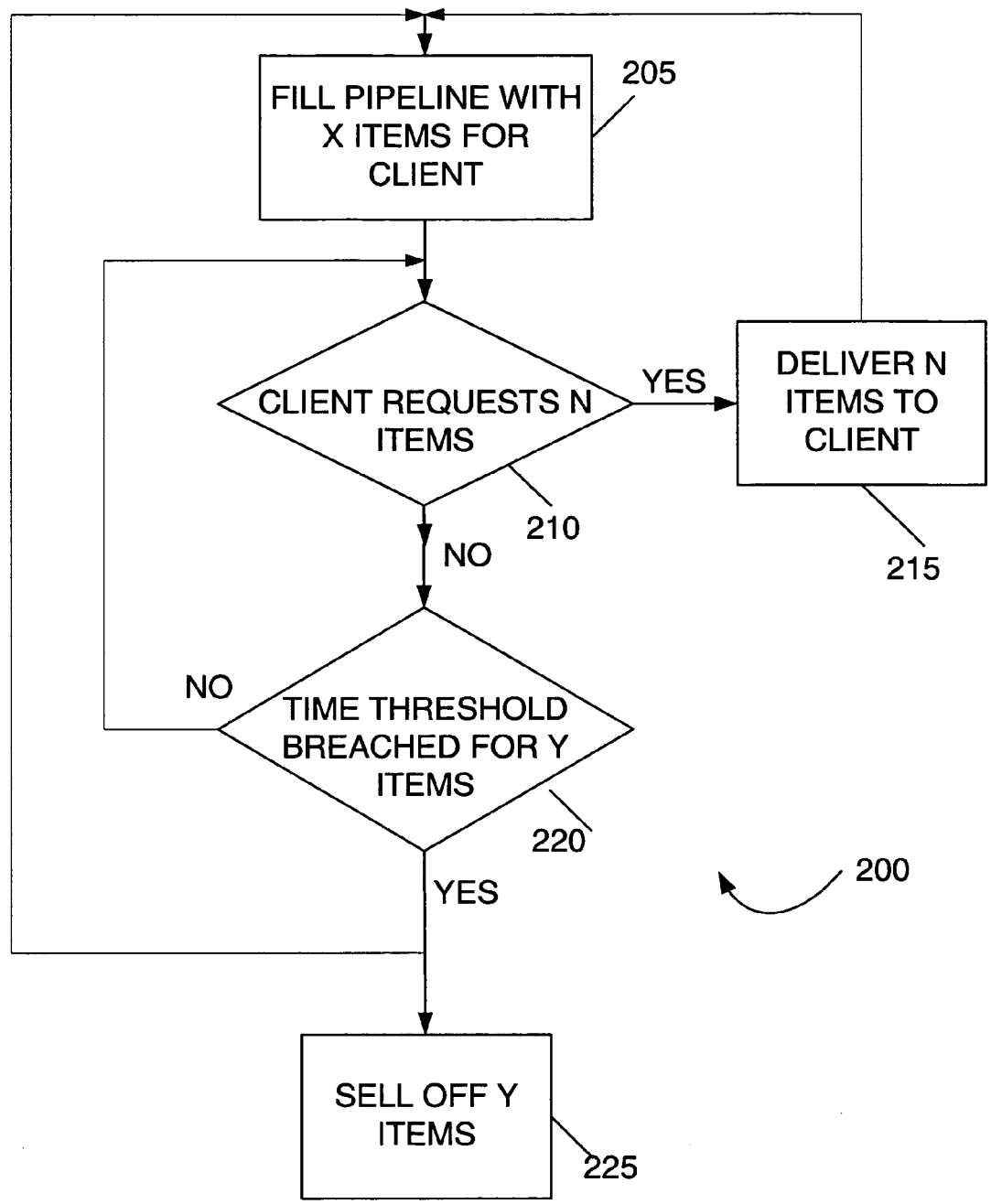
FIG. 2 is a flow chart showing a different embodiment of the present invention.

Referring now to the method 200 shown in FIG. 2, it is useful to think of the inventory of emergency business supplies as flowing through an imaginary pipeline. The pipeline is filled 205 with X items for the business (i.e. the client). The client may decide 210 to request N items, in which case those items are delivered 215 to the client, and the pipeline is subsequently filled again. However, if the client does not request items, then the items in the pipeline remain there, and may be periodically checked to see if they have breached 220 a time threshold or reached some other release condition. If Y items have breached a time threshold, then they are sold off 225, optionally (probably likely) at a discount from their original price (of course Y<X). But, if the Y items have not breached any threshold, then again the client has opportunities to request some of those items for delivery to the client.

Figure 3:
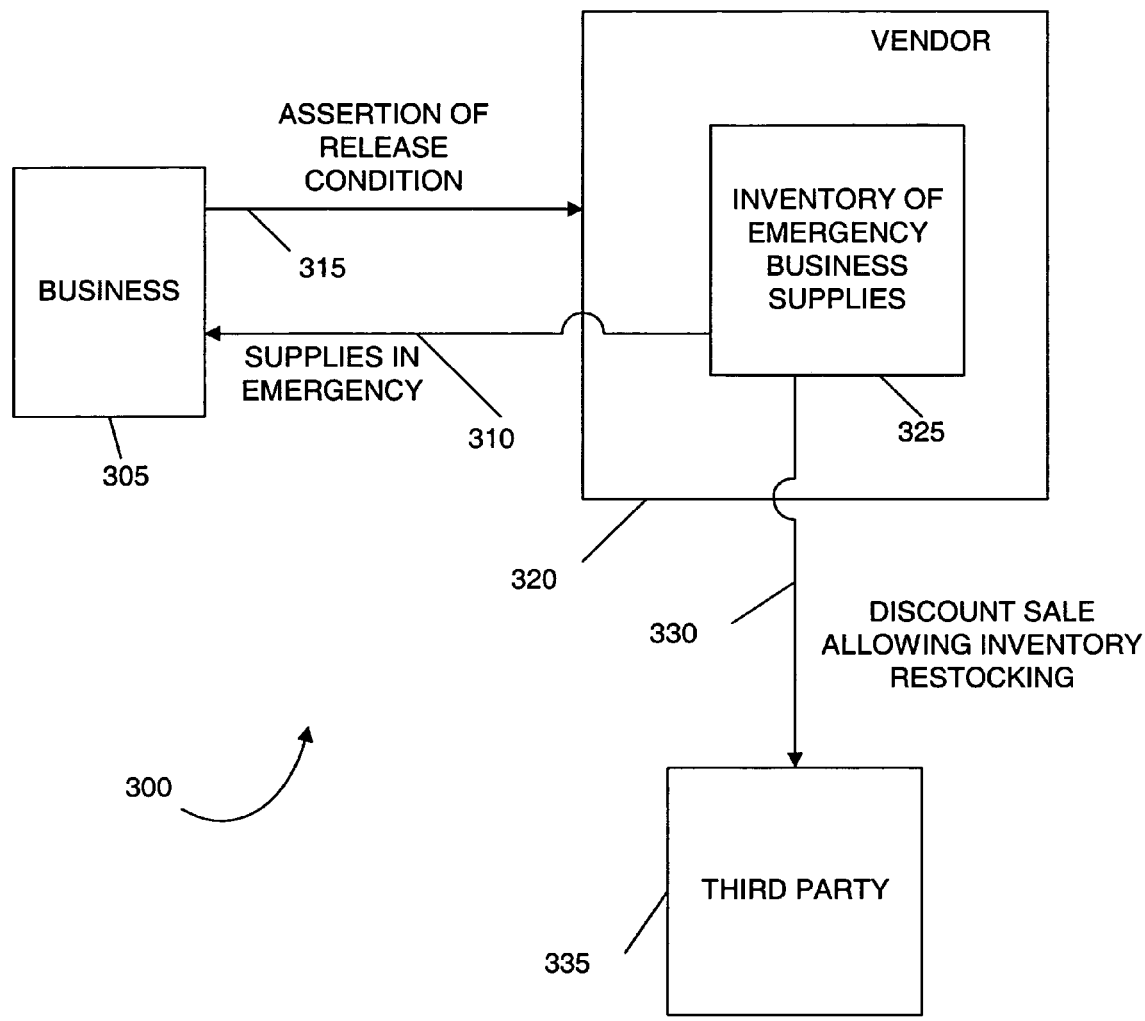
FIG. 3 is a block diagram showing a system according to the present invention.

FIG. 3 shows a system 300 according to an embodiment of the present invention. The business 305 looks at available products and models available from the vendor, and asserts 315 that a release condition has been reached, because it wants newly available products to be inserted into the inventory 325 of emergency supplies instead of old products. In such a case, the assertion is a release condition. The vendor 320 receives the assertion, and therefore conducts a discount sale 330 to a third party 335 which makes room in the inventory for restocking. In the event of an emergency, the inventory is supplied 310 to the business 305.

It is to be understood that various changes may be made in the above illustrative embodiments without departing from the scope of the invention, as will be perceived by those skilled in the art. It is intended that all matter contained in the above description or shown in the accompanying drawings shall be interpreted as illustrative and not in a limiting sense. The invention disclosed herein can be implemented by a variety of combinations of hardware and software, and in a variety of legal or contractual formats, and those skilled in the art will understand that those implementations are derivable from the invention as disclosed herein.

What is claimed is:

1. A computer implemented method of establishing and managing a vendor inventory of specific emergency business supplies guaranteed available for an identified company, comprising:

receiving compensation for costs of maintaining the inventory guaranteed available for the identified company;

releasing, using the computer, a plurality of the business supplies from the availability guarantee for sale, after the plurality of the business supplies have been in the vendor inventory for a period of time expiring when a release condition occurs; and restocking the vendor inventory.

2. The method of claim 1, wherein the sale is at a discount and further comprising:

receiving compensation from the company relating to the discount sale.

3. The method of claim 2, wherein if the company provides an assertion to the vendor that the release condition has occurred or will have occurred at a specific time, then the vendor will have only a first period of time to object to that assertion, unless the company extends the first period.

4. The method of claim 2, wherein the release condition is that improved business supplies become available for insertion into the vendor inventory.

5. The method of claim 2, wherein the release condition is that the plurality of the business supplies have reached a particular age or percentage of shelf life.

6. The method of claim 2, wherein the discount sale is to the company.

7. The method of claim 2, wherein the business supplies in the vendor inventory are owned by the vendor for at least a first period of time that the business supplies are in vendor inventory and owned by the company instead of the vendor for at least a second subsequent period of time that the business supplies are in vendor inventory.

8. The method of claim 6, wherein the company sells at least some of the business supplies to a third party after the discount sale.

9. The method of claim 6, wherein the receipt of compensation for the inventory costs, and the receipt of compensation for the discount sale are performed substantially simultaneously with the discount sale.

10. The method of claim 2, further comprising the step of providing at least a portion of the business supplies to the company routinely as needed by the company, prior to releasing the business supplies for the discount sale.

11. A computer system for establishing and managing an inventory of specific emergency business supplies guaranteed available for an identified company, comprising:

a vendor inventory system, comprising a computer, for obtaining a release condition indication;

the vendor inventory system for receiving allocation instructions and compensation from the company for maintaining the inventory of emergency business supplies as guaranteed available for the identified company; and the vendor inventory system for maintaining the inventory of emergency business supplies, wherein the inventory of emergency business supplies is allocated to the company in response to receiving the allocation instructions and the compensation from the company; and wherein the vendor inventory system at least partially releases the allocated inventory for sale after the release indication is obtained.

12. The system of claim 11, further comprising:

a sales system for selling the released inventory at a discount, wherein, the inventory of emergency business supplies is restocked after the discount sale.

13. The system of claim 11, wherein the release condition is obtained when at least part of the business supplies have reached at least one of a particular age, a particular time in inventory, or a percentage of shelf life.

14. The system of claim 11, wherein the release condition is obtained when improved business supplies become available for insertion into the vendor inventory.

15. The system of claim 11, wherein the business supplies in the vendor inventory are owned by the vendor for at least a first period of time that the business supplies are in vendor inventory and owned by the company instead of the vendor, at least temporarily at a time subsequent to the first period.

16. The system of claim 11, wherein if the company provides an assertion to the vendor that the release condition has occurred or will have occurred at a specific time, then the vendor will have a first period to object to that assertion.

17. The system of claim 12, wherein,
the discount sale is to the company.

18. The system of claim 17, wherein the sales system processes a second sale of the released inventory to a third party after the discount sale.

19. The system of claim 16, wherein the company may extend the first period.

* * * * *